(No Model.)
D. BRODERICK.
PLANTER.
No. 534,738. Patented Feb. 26, 1895.
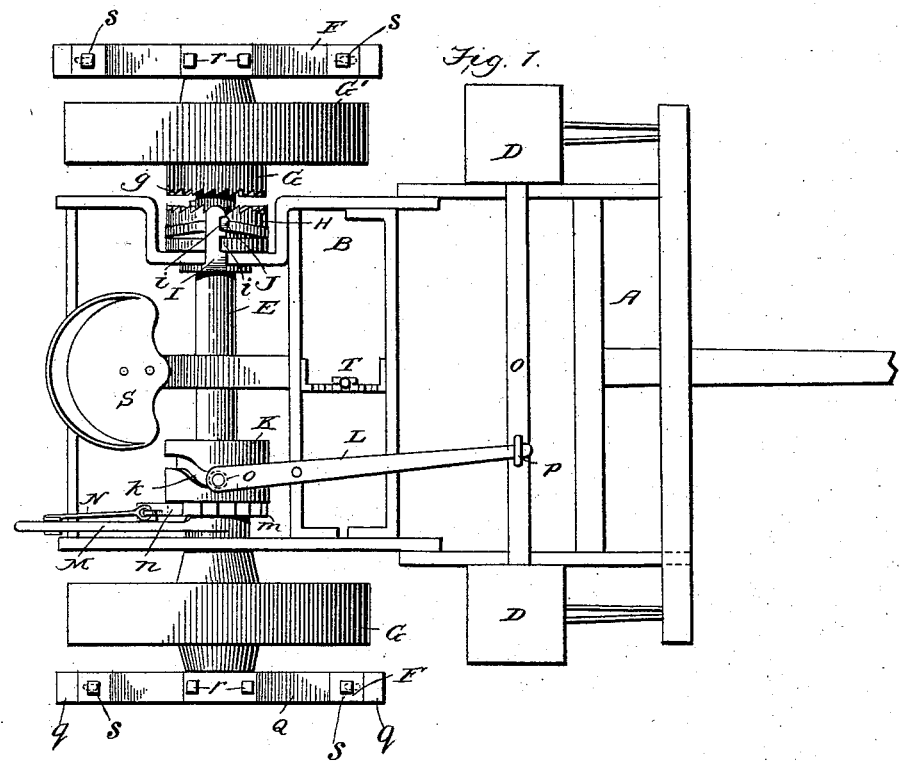
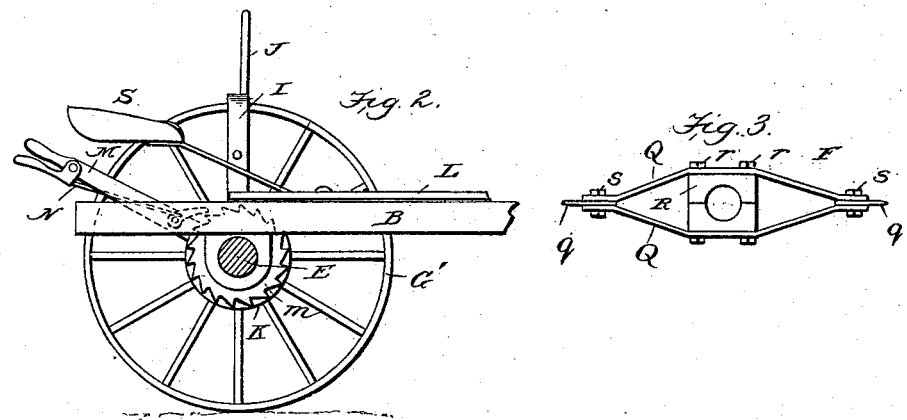
Witnesses:
Edwin L Bradford
Ralph Wormelle
Inventor
Dennis Broderick
per
Patrick O'Farrell
Attorney

United States Patent Office.

DENNIS BRODERICK, OF NEAR HILLSBOROUGH, INDIANA.

PLANTER.

SPECIFICATION forming part of Letters Patent No. 534,738, dated February 26, 1895.

Application filed September 4, 1894. Serial No. 522,047. (No model.)

*To all whom it may concern:*

Be it known that I, DENNIS BRODERICK, a citizen of the United States of America, residing near Hillsborough, in the county of Fountain and State of Indiana, have invented certain new and useful Improvements in Planters, of which the following is a specification, reference being had therein to the accompanying drawings.

The present invention aims to provide planters, especially constructed to sow corn, with means to indicate the hills so that the dropping mechanism can be set to align the machine, *i. e.*, plant the grain in checks or rows at right angles to the line of travel of the machine.

A further object of the invention, is to combine with planters an indicating appliance mounted on the same axle with the ground wheels and seed slide operating cam so as to be adjustable to compensate for any twist in the axle, said indicating appliance having adjustable penetrating points to adapt them to the nature of the soil.

A still further object of the invention is to provide simple and efficient means for throwing the machine in and out of gear and the independent adjustment of the indicating mechanism, and to reduce the number of the operating parts to a minimum.

The improvement consists of the general construction of the mechanism, the novel features and the peculiar combination of the parts which hereinafter will be more fully described and claimed, and which are shown in the annexed drawings, in which—

Figure 1— is a top plan view of a machine embodying the invention. Fig. 2— is a side elevation of the rear frame, the marker, ground wheel and the near side bar of the frame being removed. Fig. 3— is a detail view of the marker.

Similar letters refer to corresponding parts in the several views.

The letter A indicates the front part of a planter to which the pole is attached and which carries the seed boxes D and is mounted on runners in the usual manner.

The rear part B of the planter has its frame flexibly connected with the frame of the front frame so as to permit of the frames following the contour of the ground. The axle E is journaled in bearings provided on the side bars of the frame and the ends are projected beyond the ground wheels and receive the markers F. The ground wheels G are loosely mounted on the axle. The inner end of the hub of one of the ground wheels, as G, is provided with ratchet teeth $g$ which constitute a half clutch and co-operates with a corresponding half clutch H mounted to slide on the axle to and from the half clutch $g$ to key the ground wheel G' to the axle when it is required to set in motion the said dropping mechanism. The half clutch H is a sleeve or collar held on the axle by a feather and spline connection so as to revolve therewith but free to have a longitudinal movement thereon. A shipper lever J is bifurcated at its lower end, the bifurcations fitting in an annular groove in the half clutch H, and is pivoted to a standard I. The upper end of the standard is bent at right angles and provided with two notches $i$ in which the upper end of the lever J is seated to hold it in each of its two positions, either in or out to secure the half clutch H in position when in gear or out of gear with the half clutch.

The seed slide operating cam K is a circular head fixedly secured on the axle and having a peripheral groove which at desired intervals, preferably at diametrically opposite points, has angular offsets $k$ which impart the vibratory movement to the lever L at the proper time to drop the seed. A ratchet $m$ on one face of the cam is adapted to be engaged by a dog $n$ mounted on a lever M. By this means the axle can be independently rotated when out of gear to properly set the markers so that the seed will be sown in rows. The lever M is mounted on the axle and has a hand latch N by means of which the dog $n$ is operated and is thrown in and out of gear with the ratchet $m$.

The lever L is mounted on the frame of the machine and its rear end has a roller $o$ working in the groove of the cam K by means of which the lever is actuated to impart a reciprocatory movement to the said slide O by means of which the seed is caused to escape from the seed boxes, and planted in the usual manner. The forward end of the lever L works loosely in a keeper $p$ on the seed slide to draw the latter when the said lever is vibrated.

The markers F are each composed of two approximately truss shaped bars Q which have their ends brought together and clamped against the sides of blades q, the middle portion being sustained by a block R. This is centrally bored to snugly fit upon the axle and is split so as to be compressed and grip the axle firmly and rotate therewith. Bolts r pass through the bars Q and the blocks R. By loosening these bolts r the markers can be turned and properly adjusted on the axle and when brought to the required position the bolts are tightened and bind the blocks R upon the axle. The blades q are slotted and the fastenings s which secure the ends of the bars Q together pass through the slots in the blades and adjustably connect them to the bars. For hard soil the blades are set so as not to penetrate too deep. For mellow land the blades are set to enter the soil to greater depth.

The driver's seat S is centrally disposed on the rear part of the planter so that the various levers are within convenient reach.

The lever T is of usual arrangement and enables the machine to be properly set to plant deep or shallow in the ordinary and well known way. As the machine is drawn over the field, the ground wheel G' being keyed to the axle in the manner set forth, the axle is rotated and imparts motion to the cam and the markers attached thereto. The seed dropping mechanism being operated through the instrumentalities hereinbefore specified, deposits the seed which is covered by the ground wheels.

The parts are so proportioned that the markers indent the ground and point out the position of the hills.

Should the machine for any cause get out of alignment, i. e., plant the grains out of rows, the axle can be ungeared and by a proper manipulation of the lever M the axle can be turned to bring the parts into proper position for dropping the seed in the required rows.

I claim—

1. In a planter the combination with the axle, of two oppositely disposed truss shaped bars held upon the axle and having their outer end portions brought together, blades adjustably held between the ends of the truss bars, and bolts to secure the ends of the bars together and clamp the blades between them, substantially as described.

2. In a planter, the combination with the axle, of a split block mounted on the axle, oppositely disposed truss shaped bars placed one on each side of the split block, bolts passing through the bars and the blocks to secure them together and clamp the said block on the axle, and blades adjustably held between the opposing ends of the said bars, substantially as described.

In testimony whereof I affix my signature in presence of two witnesses.

DENNIS BRODERICK.

Witnesses:
F. A. TEMPLETON,
CHARLES V. GRENARD.